Dec. 31, 1963

N. B. WALES, JR 3,116,000

TAPE TRANSPORT

Filed July 7, 1960

INVENTOR.
NATHANIEL B. WALES. JR.
BY
Chas L Johnson Jr.
ATTORNEY

United States Patent Office 3,116,000
Patented Dec. 31, 1963

3,116,000
TAPE TRANSPORT

Nathaniel B. Wales, Jr., Sharon, Conn., assignor to Monroe Calculating Machine Company, Orange, N.J., a corporation of Delaware Filed July 7, 1960, Ser. No. 41,322
5 Claims. (Cl. 226—76)

This invention relates generally to tape processing apparatus, and more particularly to apparatus for transporting a longitudinally extending record medium and extracting information stored thereon.

Heretofore it has been known in the data processing art to store information on longitudinally extending record media such as tapes and thereafter to extract this information for application to data processing apparatus. The equipment for such processing has been limited in the past, in its speed of operation, due primarily to the inertia of the transport parts or of the record medium itself. For this reason it has been required in many cases that the apparatus be continuously operative in order that stored information might not be garbled, misinterpreted or lost due to the inertia problem. To combat the situation many complex devices have been evolved. Some are directed to intricate controls for driving, anticipating and compensating for the record medium movement during the more severe effects of inertia while others have directed their efforts to devising tape materials better suitable for the system in which they are to be used. Illustrative of these expensive tapes are the well-known plastic and metallic steel magnetic tapes.

The undesirable characteristics of course are primarily important during the accelerating and decelerating phases of tape operation, the ideal solution comprising apparatus which will provide instant, positive control over the tape movement without loss or distortion of the information being read. It is to the solution of this problem that the present invention is directed.

It is therefore a principal object of this invention to provide record medium transport apparatus having the characteristics of instant, positive control over the record medium movement.

It is another object of this invention to provide economical tape transport apparatus simple in construction which will allow rapid movement, acceleration and deceleration of the tape without loss or distortion of the information stored thereon.

It is another object of this invention to provide apparatus to transport a paper tape and transpose information stored thereon in the form of space coded punched holes arranged transversely to the longitudinal axis along which the tape may be transported.

It is a further object of the invention to provide tape transport apparatus having a magnetizable drive sprocket intermediate a fixed and a rotating electromagnet member whereby a record tape may be driven or held fixed by the energization of one of the two electromagnets.

These and other novel features of the invention are set forth in the appended claims and the invention as to its organization and its mode of operation will best be understood from a consideration of the following detailed description of the preferred embodiment when used in connection with the accompanying drawings which are hereby made a part of the specification, and in which:

In a preferred embodiment of the invention a sprocket wheel for driving tape is coaxially mounted for rotation between a fixed and a continuously driven drum. The thin low inertia sprocket wheel or disc is constructed of magnetically responsive material, for example steel, and is mounted for rotation about the common axis of the two drums. This disc is further mounted for axial movement between contacting relations with the two drums.

The alternative positioning of the drive sprocket wheel is signal controlled by magnetic field generating means enclosed within each of the drums. Thus when one of the magnetic coils is energized the tape engaging sprocket wheel is drawn into contacting relation with the drum containing the coil. In this way the low inertia driving sprocket avoids the lag and overdrive which normally results from the acceleration and deceleration of a high inertia system. In the preferred embodiment one drum is held fixed and the other drum is a high inertia, constantly rotating member. It should be realized, however, that for certain phases of operation it may be desired to have both drums rotating at different velocities and perhaps even in opposite directions. Also, the two coils could be wound concentrically and made moveable axially so that the sprocket could remain in a single lateral position and yet the under the rotational control of two or more magnetic coils. It is also seen that with proper commutation the coils themselves may be rotatable rather than having a rotatable drum around a fixed coil.

Figures 1, 2, 4:
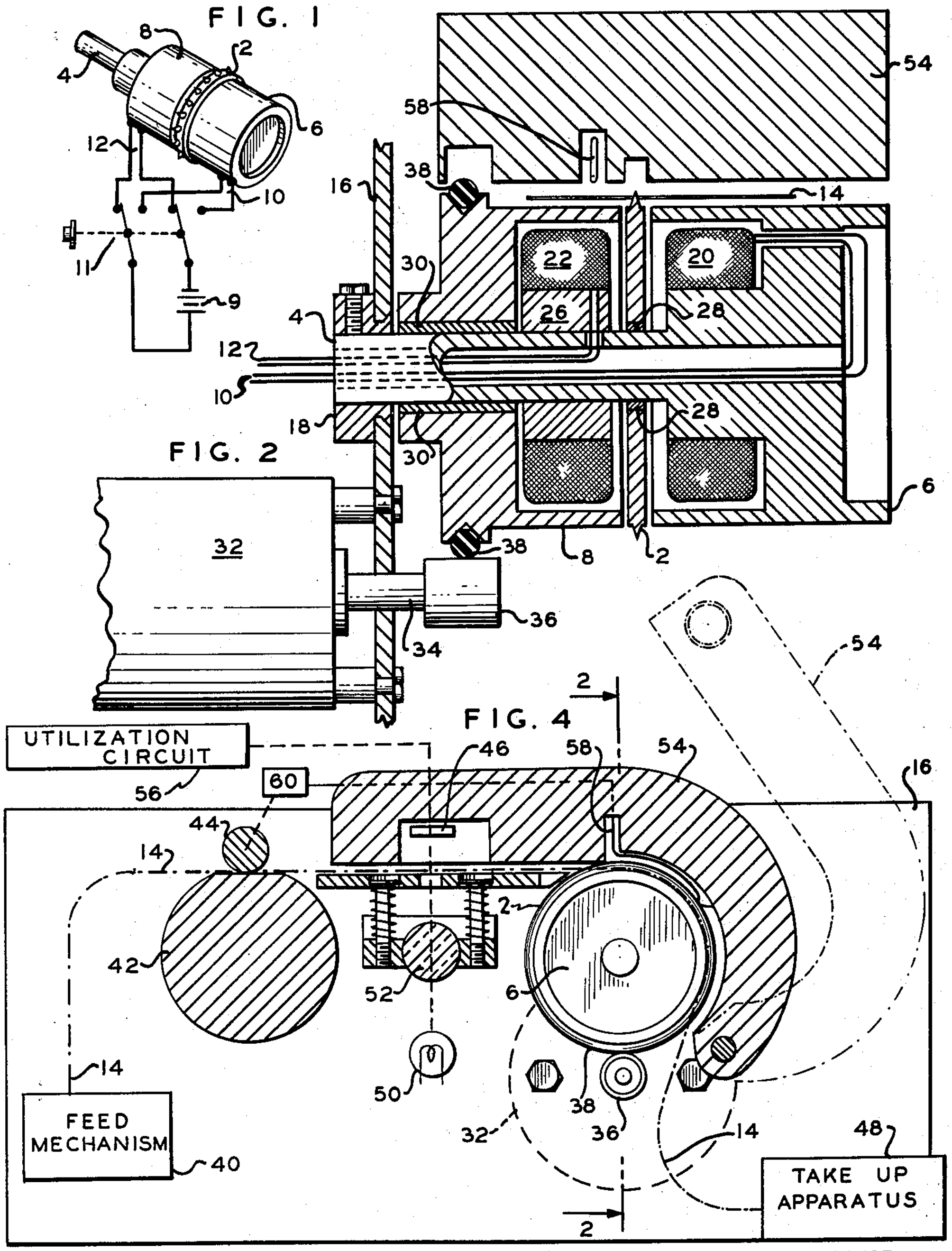
FIG. 1 is a perspective view of a preferred embodiment of the tape transport.
FIG. 2 is a cross-section end view of a tape drive mechanism as viewed along line 2—2 of FIG. 4.
FIG. 4 is a partially sectioned elevation view of a portion of a tape drive mechanism employing the invention.
Figure 3:
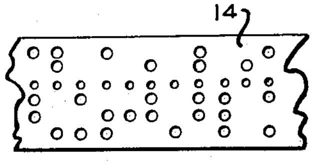
FIG. 3 is a plan view of a section of tape which may be used with the invention.

Referring to FIG. 1 which illustrates a preferred embodiment of the invention a drive sprocket wheel 2 is journaled on shaft 4 along with fixed drum 6 and rotating drum 8. When current from source 9 is applied to the conductors 10 of drum 6 by way of switch 11 a magnetic field is set up to attract the sprocket 2 and to hold the sprocket securely so as to prevent rotation. When the current is disconnected from conductors 10 by switch 11 and applied to conductors 12 and to the coil of rotating drum 8 the sprocket moves rapidly against drum 8 and begins to immediately rotate at the same speed as the drum. By utilizing the sprocket to drive a record tape such as shown in FIG. 3 a positive acting drive is provided which yields almost instantaneous starting and stopping characteristics without the loss of control experienced in a high inertia system.

FIGS. 2 and 4 show an application of the invention in tape reading apparatus which will now be described in detail. Many of the elements were described in reference to FIG. 1 and the same numerals will therefore be utilized again. The tape 14 of FIG. 3 is seen in FIG. 2 with the sprocket 2 protruding through at least one of the centrally located drive apertures. It is to the efficient transport of such tape that this invention is directed.

In FIG. 2, a frame 16 is used for support of the various members of the tape transport device. A plate 18 is secured to the frame 16 and provides a means for securing the tubular shaft 4 to the plate 18. Electromagnetic coils 20 and 22 are wound around core material of drum 6 and core material 26, the drum 6 being fixed to the tubular shaft 4 while the material 26 is secured by press fit or otherwise to the shaft 4 so as to prevent relative movement therebetween. The tubular shaft 4 is rigidly secured to the drum 6 so that the drum 6, shaft 4, coils 20 and 22, plate 18, and frame 16 are all held firmly together.

Bushing or bearing 28 is provided to allow free rotation of sprocket 2 about shaft 4 while bushing 30 allows drum 8 to rotate freely about shaft 4.

Conductors 10 and 12 may be seen to pass through the fixed tubular shaft 4 to their respective coils 20 and 22.

A motor 32 is provided as the drive source for drum 8. The motor is mounted on frame 16 and has a shaft 34 journaled through the frame, the said shaft having a sleeve 36 pressed thereon. A circular grommet 38 is provided in a groove or V-shaped slot in the periphery of drum 8 for facilitating rotation of the drum from the drive force transmitted from the motor shaft sleeve to the grommet. Movement of the grommet of course causes drum 8 to rotate.

It is thus seen that when current is applied to coil 20, the magnetic force generated will cause sprocket 2 to move laterally toward coil 20 until it abuts the shoulder of drum 6. In this position the tape 14 will be held stopped in a positive manner. Upon removal of current from the conductors 10 and its application to conductors 12, electromagnetic coil 22 is energized causing the sprocket to move laterally to abut the shoulders of drum 8 and to be carried along with the drum. In this mode of operation the tape will be driven by the sprocket at the rate of rotation of the drum. With the drum 8 rotating constantly the tape may be altered almost instantly from a standstill position when coil 20 is energized to full speed when coil 22 is energized and back to a full stop when coil 20 is reenergized.

FIG. 4 illustrates a setting for the invention in a tape reader in which a feed mechanism 40 provides tape 14 for passage between tape guide 42 and wheel 44 past photoelectric readout cells 46 to the drive sprocket 2 adjacent drums 6 and 8 and out to the take-up apparatus 48. The light source 50 is mounted near lens 52 so that light from the source may pass through apertures in the tape 14 to photocells 46 in the pickup arm 54. The output of the photocells is conducted to the utilization circuit 56 where the tape information is used. Sensing conductor 58 is provided to regulate the control circuit 60 so as to cause the tape to be driven by wheel 44 until the tape disconnects the conductor 58 from the grounded housing 8 at which time drive by the wheel 44 ceases and drive by the sprocket 2 commences.

The invention has thus been described in its preferred embodiment and from the description it is obvious that the objects have been realized.

It should be understood that this invention is not limited to specific details of construction and arrangement thereof herein illustrated, and that changes and modifications may occur to one skilled in the art without departing from the spirit of the invention; the scope of the invention being set forth in the following claims.

What is claimed is:

1. Transport apparatus for a longitudinally extending tape record member having a plurality of apertures spaced in longitudinal disposition therealong which comprises; a first rotatably mounted drum member, a second fixedly mounted drum member each of said drum members having a like diameter and both of said members being coaxially mounted, a rotatably mounted, substantially planar drive member constructed of magnetically responsive material and having aperture engaging teeth circumferentially disposed thereabout, said drive member being mounted between said drum members and coaxially therewith in magnetically influenced relation with both of said drum members, first and second signal controlled, magnetic field generating means associated respectively with each of said drum members for urging said drive member axially into alternative contacting relation with said drum members, drive means for continuously rotating said first drum member, and control means for selectively energizing said magnetic means whereby said drive member is controllably and alternatively driven into contacting relation with said drum members.

2. Transport apparatus for a longitudinally extending tape record member having a plurality of apertures uniformly spaced in longitudinal disposition therealong which comprises; a first rotatably mounted drum member, a second fixedly mounted drum member coaxially mounted with the said first member, a rotatably mounted substantially planar drive member constructed of magnetically responsive material, said drive member being mounted between said drum members and coaxially therewith in magnetically influenced relation with both of said drum members, first and second signal controlled magnetic field into alternative contacting relation with said drum members respectively for urging said drive member axially into alternative contacting relation with said drum members, drive means for continuously rotating said first drum member, and control means for selectively energizing said magnetic means whereby said drive member is controllably driven into contacting relation with one or the other of said drum members.

3. Tape transport apparatus for use with perforated tape comprising a current source, a frame, a first electromagnetic coil mounted in fixed relation to the said frame and having a fixed drum proximate the said coil, a second electromagnetic coil aligned substantially axial with the said first coil and having a rotatable drum proximate the said second coil, and a drive sprocket mounted between the said coils and so aligned that when the said current source is connected to either of the said coils the sprocket will be magnetically drawn toward the energized coil and assume the rotational characteristic of the drum of the energized coil.

4. Tape transport apparatus comprising a current source, a frame, a perforated tape member, a first electromagnetic coil mounted in fixed relation to the said frame and having a fixed drum proximate the said coil, a second electromagnetic coil aligned substantially axially with the said first coil and having a rotatable drum proximate the said second coil, and a drive sprocket mounted between the said coils in a manner to engage perforations in the perforated tape member and so aligned that when the current source is connected to either of the coils the sprocket will be magnetically drawn toward the energized coil and assume the rotational characteristic of the drum of the energized coil and thereby transport the perforated tape member according to the rotational characteristic of the drum of the energized coil.

5. Transport apparatus comprising a longitudinally extending tape record member having a plurality of apertures spaced in longitudinal disposition therealong, a first rotatably mounted drum member, a second fixedly mounted drum member each of said drum members having a like diameter and both of said members being coaxially mounted, a rotatably mounted, substantially planar tape drive member constructed of magnetically responsive material and having aperture engaging teeth circumferentially disposed thereabout for engaging the tape record member, said tape drive member being mounted between said drum members and coaxially therewith in magnetically influenced relation with both of said drum members, first and second signal controlled, magnetic field generating means associated respectively with each of said drum members for urging said tape drive member axially into alternative contacting relation with said drum members, drive means for continuously rotating the said first drum member, and control means for selectively energizing said magnetic means whereby the said tape drive member is controllably and alternatively driven into contacting relation with the said drum members so as to transport the tape record member in a manner representative of the rotative characteristic of the drum associated with the energized magnetic means.

References Cited in the file of this patent

UNITED STATES PATENTS

| | | |
|---|---|---|
| 2,962,139 | Straub | Nov. 29, 1960 |
| 2,999,625 | Lapointe | Sept. 12, 1961 |

FOREIGN PATENTS

| | | |
|---|---|---|
| 518,098 | Canada | Nov. 1, 1955 |

UNITED STATES PATENT OFFICE
CERTIFICATE OF CORRECTION

Patent No. 3,116,000 December 31, 1963

Nathaniel B. Wales, Jr.

It is hereby certified that error appears in the above numbered patent requiring correction and that the said Letters Patent should read as corrected below.

Column 2, line 25, for "the", first occurrence, read -- be --; column 4, line 5, after "field" insert -- generating means associated with each of said drum members respectively for urging said drive member axially --; line 7, after "bers" insert a comma and strike out "respectively for urging said drive member axially"; same column 4, lines 8 and 9, strike out "into alternative contacting relation with said drum members,".

Signed and sealed this 9th day of June 1964.

(SEAL)
Attest:

ERNEST W. SWIDER
Attesting Officer

EDWARD J. BRENNER
Commissioner of Patents